United States Patent
Mahalingaiah

(10) Patent No.: US 7,970,929 B1
(45) Date of Patent: Jun. 28, 2011

(54) APPARATUS, SYSTEM, AND METHOD FOR ROUTING DATA TO AND FROM A HOST THAT IS MOVED FROM ONE LOCATION ON A COMMUNICATION SYSTEM TO ANOTHER LOCATION ON THE COMMUNICATION SYSTEM

(75) Inventor: Rupaka Mahalingaiah, Austin, TX (US)

(73) Assignee: Dunti LLC, Austin, TX (US)

( * ) Notice: Subject to any disclaimer, the term of this patent is extended or adjusted under 35 U.S.C. 154(b) by 641 days.

(21) Appl. No.: 10/100,980

(22) Filed: Mar. 19, 2002

(51) Int. Cl.
  *G06F 15/173* (2006.01)
(52) U.S. Cl. ........ 709/238; 709/220; 709/236; 709/239; 370/331; 370/338
(58) Field of Classification Search .................. 709/238, 709/239, 220, 236; 370/331, 338
  See application file for complete search history.

(56) References Cited

U.S. PATENT DOCUMENTS

| | | |
|---|---|---|
| 4,538,026 A | 8/1985 | Yasue |
| 5,095,480 A | 3/1992 | Fenner |
| 5,134,610 A | 7/1992 | Shand et al. |
| 5,425,026 A | 6/1995 | Mori |
| 5,444,702 A | 8/1995 | Burnett et al. |
| 5,485,455 A | 1/1996 | Dobbins et al. |
| 5,524,254 A | 6/1996 | Morgan et al. |
| 5,596,715 A | 1/1997 | Klein et al. |
| 5,633,869 A | 5/1997 | Burnett et al. |
| 5,721,819 A | 2/1998 | Galles et al. |
| 5,822,309 A | 10/1998 | Ayanoglu et al. |
| 5,864,683 A | 1/1999 | Boebert et al. |
| 5,961,607 A * | 10/1999 | Schaefers ....................... 709/249 |
| 6,006,090 A | 12/1999 | Coleman et al. |
| 6,119,171 A | 9/2000 | Alkhatib |
| 6,130,892 A * | 10/2000 | Short et al. ..................... 370/401 |
| 6,134,589 A | 10/2000 | Hultgren |
| 6,157,967 A | 12/2000 | Horst et al. |

(Continued)

FOREIGN PATENT DOCUMENTS

EP 0 403 973 12/1990

(Continued)

OTHER PUBLICATIONS

"Demystifying Bandwidth Management," © Lucent Technologies, Inc., pp. 1-12.

(Continued)

*Primary Examiner* — Thuong T Nguyen
(74) *Attorney, Agent, or Firm* — Charles D. Huston; Daffer McDaniel, LLP

(57) ABSTRACT

An architecture, system, and method are provided for transparently mapping a network identification number of a host to an access point of an internet. The host can be moved from a first point to a second point on the internet without having to reconfigure routing tables or to update routing protocols. The network identification number of the host does not change as it is moved from the first point to the second point. Thus, the network identification number of the host does not perform routing. Instead, routing occurs by targeting the exit end module onto which the host is connected, i.e., at the second point. The exit end module thereby contains configuration registers which store mapping tables that note the new destination address of any data being sent to the new host location, and properties such as security and priority codes.

18 Claims, 4 Drawing Sheets

U.S. PATENT DOCUMENTS

| | | | |
|---|---|---|---|
| 6,170,025 B1 | 1/2001 | Drottar et al. | |
| 6,173,312 B1* | 1/2001 | Atarashi et al. | 709/203 |
| 6,226,267 B1 | 5/2001 | Spinney et al. | |
| 6,237,061 B1 | 5/2001 | Srinivasan et al. | |
| 6,260,120 B1 | 7/2001 | Blumenau et al. | |
| 6,275,494 B1 | 8/2001 | Endo et al. | |
| 6,292,492 B1 | 9/2001 | Bonomi et al. | |
| 6,304,552 B1 | 10/2001 | Chapman et al. | |
| 6,356,551 B1 | 3/2002 | Egbert | |
| 6,370,592 B1* | 4/2002 | Kumpf | 719/328 |
| 6,393,482 B1* | 5/2002 | Rai et al. | 709/225 |
| 6,421,714 B1* | 7/2002 | Rai et al. | 709/217 |
| 6,466,964 B1* | 10/2002 | Leung et al. | 709/202 |
| 6,487,605 B1* | 11/2002 | Leung | 709/245 |
| 6,490,259 B1* | 12/2002 | Agrawal et al. | 370/331 |
| 6,519,242 B1* | 2/2003 | Emery et al. | 370/338 |
| 6,600,727 B1* | 7/2003 | Mackay | 370/293 |
| 6,795,857 B1* | 9/2004 | Leung et al. | 709/224 |
| 6,889,321 B1* | 5/2005 | Kung et al. | 713/153 |
| 7,031,307 B2* | 4/2006 | Kon et al. | 370/389 |
| 2001/0041556 A1* | 11/2001 | Laursen et al. | 455/406 |
| 2002/0114326 A1* | 8/2002 | Mahalingaiah | 370/389 |
| 2003/0163544 A1* | 8/2003 | Wookey et al. | 709/217 |
| 2003/0229809 A1* | 12/2003 | Wexler et al. | 713/201 |
| 2005/0254493 A1* | 11/2005 | Chang et al. | 370/389 |

FOREIGN PATENT DOCUMENTS

| | | |
|---|---|---|
| EP | 0 751 642 | 1/1997 |
| EP | 0 855 820 | 7/1998 |

OTHER PUBLICATIONS

"Delivering Internet Access Quality of Service," © Lucent Technologies, Inc., pp. 1-8.

Lucent Technologies, "CBQ Frequently-Asked Questions," www.xedia.com/products/cbq_faq.htm, last modified: May 26, 1999.

Antonio et al., "A Fast Distributed Shortest Path Algorithm for a Class of Hierarchically Structured Data Networks," © 1989 IEEE, pp. 183-192.

Tsuchiya, "Efficient Utilization of Two-Level Hierarchical Addresses," © 1992 IEEE, pp. 1016-1021.

Stevens, *TCP/IP*, Addison-Wesley 2000, pp. 37-45.

\* cited by examiner

APPARATUS, SYSTEM, AND METHOD FOR ROUTING DATA TO AND FROM A HOST THAT IS MOVED FROM ONE LOCATION ON A COMMUNICATION SYSTEM TO ANOTHER LOCATION ON THE COMMUNICATION SYSTEM

BACKGROUND OF THE INVENTION

1. Field of the Invention

This invention relates to a communication system (i.e., internet) that allows a host to be moved from a first point on the internet to a second point on the internet. The second point may be coupled to an entirely different local network (i.e., intranet) than the intranet on which the first point is coupled. The present invention allows the host to register its routing identifier to the second point, where any data sent to the host previously coupled to the first point will get automatically rerouted to the second point.

2. Description of the Related Art

The following descriptions and examples are not admitted to be prior art by virtue of their inclusion within this section.

A communication system is generally regarded as an interconnected set of subnetworks or subnets. The system can extend over many localized subnets as an intranet, and can extend globally across multiple subnets or intranets to form an internet. One important purpose of an internet is the capability of sending data between two hosts that may reside on different intranets. The data can be sent to almost anywhere around the world. An intranet can be referred to as a network of devices that perform routing or other traffic-forwarding functions within a single autonomous system. An internet connects the various intranets and allows communication within and between autonomous systems. An autonomous system is, therefore, a collection of one or more networks under a common administrator that share a common routing strategy, or "domain."

A host is any device which can send and receive data and, as used herein, is generally found at the end node of an autonomous system. Typical hosts include such devices as terminals, personal computers, printers, personal digital assistants ("PDAs"), or any device which can send and receive data in any form whatsoever.

Data can be sent in numerous ways. A popular mechanism for transferring data across an internet involves placing the data in a packet. The packet can be switched and sent across different routes of the network at the same time, and then reassembled at the proper destination host. In order to ensure the packets are properly received, certain layers of the Open System Interconnect ("OSI") model of the International Standards Organization protocol stack will wrap the data before the data is sent across the network. For example, TCP can divide data into segments which are then placed into, for example, Internet Protocol ("IP") datagrams having a header which includes the IP address of the originating and receiving hosts. It is not until the packet has been wrapped possibly numerous times, at the network layer and the data/physical layers, will the TCP be forwarded across the network.

The destination address of a wrapped packet are directed across the internet using packet processors and routing tables accessible to the packet processors. The packet processors generally found within routers function to open the IP addressed packet and read the IP destination address. The mechanism for determining the best route in which to send the packet involves comparing the destination address against an internal database called the routing table. Routing tables are generally dynamic in nature and can accommodate a multiplicity of nodes and/or forwarding modules of a rather large internet. Each node can have its own unique IP identification number, or can have a lower layer identification number (address), such as the popular Ethernet addresses. As the internet is reconfigured with new routers, bridges, switches, and/or gateways, the routing tables can dynamically change to ensure an optimal transfer of data.

As a precept to the routing function, hosts which are connected to the internet must have a unique identification number. In this manner, a user being targeted to receive data will know that the data was sent from a particular user (source address), and the user which sourced the data will know where to send the data (i.e., to the unique destination address). Keeping track of who is sending data and where the data is to be sent is the function of the IP address. A packet may, therefore, contain both a destination field and a source field, into which the destination IP address and source IP address are placed.

Internet Protocol Version 4 ("IPv4") specification has established that the source and destination addresses be 32 bits in length. Thus, the destination field contains 32 bits which identifies the IP address of the targeted host, and the source field also contains 32 bits which identifies the source host. FIGS. 1 and 2 help illustrate an IPv4 routing mechanism. It is understood, however, while 32 bits are used in the IPv4 specification, the dramatic increase in IP addresses has required larger source and destination fields, thus, leading to the IPv6 specification containing 128 bits in the source and destination fields. For sake of simplicity, however, a 32-bit field is shown in the examples of FIGS. 1 and 2.

FIG. 1 illustrates an internet 10 containing multiple intranets 12a, 12b, and 12c. Each intranet 12 has its own addressing domain and, thus, can be considered as having its own stand-alone network. Intranet 12a can, therefore, be considered as the first network, intranet 12b as the second network, and intranet 12c as the third network, each of which are interconnected by communication line 14. A main advantage of internet 10 is the ability to communicate between host 16 and host 18. For example, host 16 can send data as one or more packets of information. As the data is presented for transmission, the source address of host 16 is placed in the source field and the destination address of host 18 is placed in the destination field. There may be multiple routers, switches, gateways, etc. 20 (devices 20a, 20b, 20d, 20e, 20i, 20j, and 20k) placed between host 16 and host 18. As the data begins at host 16, an upper level address (i.e., IP address) is placed on the packet corresponding to the IP identifier of host 16. The destination address (IP identifier) corresponding to host 18 is also placed on the packet. As the packet traverses dissimilar addressing domains, the packet may be further wrapped with lower OSI addressing layers depending on the data/physical layer configurations of those addressing domains. Data link/ physical link destination address can be further wrapped upon the upper layer IP destination address. For example, a destination IP address of 33.0.10.25 can be placed on the packet, along with possibly a lower layer, 48-bit Ethernet address corresponding to host 18. Placing the lower addresses typically occurs when the packet enters a new domain, such as addressing domain 3, shown in FIG. 1.

In an effort to reduce the routing table size in each of the various routers or switches 20, not all 32 bits need be examined, and some of the bits can be masked as "don't care" bits. As shown in FIG. 2, the IPv4 specification can involve classed or classless addressing. For example, class C IPv4 addresses have an 8-bit network ID field and a 24-bit host ID field. Class B addresses have a 16-bit network ID field and a 16-bit host ID field. Class A addresses have a 24-bit network ID field and an 8-bit host ID field. Segmenting the host destination fields can oftentimes be inefficient if, for example, a user is barely within the upper class range, resulting in his/her inefficient use of the IP addresses allocated to that user.

Referring to FIGS. 1 and 2, three networks are illustrated, each having its own unique network identifier. For example, identifier for network 1 is 168.10, identifier for network 2 is 32.0, and identifier for network 3 is 33.0. While the network identification field contains the various addresses of each of the autonomous intranets, the host identification field contains the unique addresses of each host within a given intranet. For example, host 18 within network 3 can have a host address of 10.25. When addressing host 18, both the full network address 33.0 and host address 10.25 are used, with the network address being used first with the host address being masked during the original compare operation within, for example, a content-addressable memory ("CAM") containing the routing tables. Thus, a classed internet or inter-domain routing mechanism involves partially masking the destination address, as shown by reference numeral 30 in FIG. 2. In this manner, the intranet can be quickly found within the memory array and, thereafter, the particular host within that intranet can be found by masking the network address and performing compare operations on only the destination host field.

Due to the inefficiencies of using a classed routing scheme, a classless scheme referred to as "classless inter-domain routing" ("CIDR") has arisen. According to CIDR, a floating boundary exists between the network field and the host field. The network field indicates the "prefix length" of the CIDR address. A technique known as longest matching prefix is applied, with masking cells of the CAM memory being set to incrementally mask bits stored in the memory cell during the compare operation. If there are multiple matches, the matching data within the memory cell with the lowest numerical CAM address (the longest matching prefix) is provided. This address is, therefore, the address at which the destination host 18 resides.

Regardless of whether classed or classless routing is employed, the basic routing concept remains: to route data to the physical address at which the destination host resides. If host 18 is moved from one location on the internet to another location on the internet, as shown by arrow 34 in FIG. 1, the routing tables must be updated. If not, the routers will attempt to send the data to the location at which host 18 previously resided. When the IP identifier of host 18 is not present at that location, the packet will most likely be dropped and no communication will ensue. A problem, therefore, exists whenever a user of host 18 disconnects host 18 and goes to another node on the internet and reconnects his/her host. If the user wants to resume normal communication with other hosts on the internet, conventional routing mechanisms do not allow for non-notified roaming of hosts. In other words, each host is assigned a unique IP identifier based on where that host is connected in the internet. Thus, host 18 may have been connected at a first point attributable to intranet 12c having a network and host address of 33.0.10.25. Unless reconfigured, when host 18 moves from intranet 12c and is connected to intranet 12b, the network and host identifiers will move with host 18. Thus, when routing ensues to host 18, the non-reconfigured routing tables will not be able to find host 18 placed at the second point within intranet 12b since routing must first go to the network address 32.0, and the destination network address 33.0 of host 18 at the second point simply is not the same as 32.0. Each time a host is moved from one point to another, the user must notify a network administrator, who then updates the routing tables and performs an address resolution protocol ("ARP") which maps the network address to the media access controller ("MAC") addresses of the first and second points on the network. Unfortunately, each time a user removes his/her host from one point and connects it to another point, the user's mobility is severely limited.

It would be desirable to derive a mechanism which overcomes this lack of mobility, and which can allow a user to couple his/her host, for example, to a network within one company or organization and, thereafter, disconnect his/her host and reconnect the host to another network within another company or organization maybe in some other portion of the country or world. All of this beneficially taking place without the user having to inform the administrator to update routing tables or to resolve updated addresses.

SUMMARY OF THE INVENTION

The problems outlined above are in large part solved by an addressing mechanism that allows transparent communication between hosts, even though one or both hosts have been moved in their location upon the internet. A first host can send information to a second host, regardless of whether the second host is at a first point on the internet or a second point on the internet. The addressing mechanism takes into account dissimilar addressing domains, and allows a host to be moved from an internet which transports data according to a first addressing domain to another internet which transports data according to a second addressing domain. Regardless of where the hosts are configured on the internet and regardless of what addressing domain the host must operate under, the present addressing mechanism allows communication between roaming hosts without having to reconfigure routing tables or resolve addressing protocols each time a host is moved. This affords true mobility and does not limit the user to have to inform a network administrator each time he/she displaces their host from one location to another.

The mobile networking environment is beneficial in that the networking address or identifier of a host need not change as the host is moved from a first point to a second point on the internet. Even though the first and second points may be in different cities or in different countries, each using a dissimilar addressing domain, the movable host maintains its unique network identifier. The network identifier, however, is not used for routing data. Instead, an end module to which the host is connected routes data. The end module maintains a unique identification number or address that is preferably dependent on where that end module is located relative to other nodes within the network. As the host is moved from a first point to a second point, the network identification number of the host is imputed to the end module to which it is connected. In addition, certain properties of the host are also imputed to the end module. The end module thereby retains characteristics of the host no matter where the host originally resided (i.e., the "home location" of the host).

As the host is connected to the second point, the end module which receives the host becomes, in essence, the new destination address. The identification number of that end module at the second point is thereby the destination address of all data being sent to the host connected at the second point.

Instead of the end module identifier being segmented into classes or segmented according to a network identification field and a host identification field, the end module, targeted as the destination, simply has a relatively small addressing field that corresponds to the addressing domain of that end module. In other words, the end module can have a fairly small addressing field dependent on the size of the intranet to which it is connected.

The end module that receives a host will also receive the network identification of the host and properties of that host whenever the host is connected and registration is undertaken. Registration involves the user activating software contained on the host to initiate a log-in procedure. Log-in involves fetching the network identification number of the host and properties of the host, and downloading the associated information into a one or more storage locations (e.g., at least one register) within the end module. The register thereby contains not only security and priority information of any data arising from or sent to the connected host, but also contains one or more mapping tables. The mapping tables not only map the network address of the host to the end module address, but also can map the network address to a particular host among possibly numerous hosts that can be connected to the end module. The mapping table of the network address and end point address can be forwarded to an entry end module that initially receives data destined for the destination host. In this fashion, data sourced from a source host will get translated to the end module address (i.e., the address of the exit end module) rather than the network address. When the data is received on the exit end module, another mapping table resident within the exit end module will map the network address, which is initially wrapped onto the packet, to the appropriate host connected to the exit end module. Thus, the entry end module will wrap onto the network address the lower layer physical/data address of the exit end module so that the data will arrive at the appropriate exit end module to which the user has moved his/her host.

According to one embodiment, a communication system is provided. A communication system comprises a network of interconnected nodes. Connected to the network is a first end module and a second end module. The first and second end modules each have a unique identification number. A mapping table within the second end module corresponds the unique identification number of the second end module with the address of the host (i.e., the network address) removed from the first end module and coupled to the second end module. The mapping table thereby maps the identification number of the end module with a network address of a host connected to that end module so that all data sent to the host will be initially sent to the end module on which the host is connected. Thereafter, the data can be forwarded to the host from that end module using another mapping table which corresponds the network address to the particular host attributable to the second end module.

Data is sent to the host by addressing the identification number of the second end module rather than the first end module, after the host is removed from the first end module and coupled to the second end module. The identification number of the first and second end modules can, according to one example, be an address of the media access controller found within the first end module and the second end module, respectively.

The network to which the first and second end modules are connected can be either a structured network or a non-structured network. A structured network is one that is routing deterministic and contains a plurality of interconnected intermediate modules. Each of the intermediate modules perform only a portion of a distributed routing operation that extends across the network.

According to another embodiment, an end module is presented. The end module comprises a configuration register that is configured to store a mapping table of an identification number for the end module corresponding to an address of a host removed from another location distal from the end module and, thereafter, coupled to the end module. The end module also comprises a compare unit coupled to the configuration register for receiving a packet of data wrapped with the identification number of the end module. The compare unit is thereby used to route the data to the host if the identification number in the mapping table corresponds to the address of the host.

The configuration register of the end module can be further adapted to store a property of the host, conveyed from the host when the host is coupled to the end module and a log-in procedure is undertaken. The property includes an address of the host, a security code, and/or a priority code. The security code can thereby be placed on a packet of data symbolizing an amount of security attributed to the data as the data is sent from the end module to the communication system. The priority code symbolizes an amount of transmission priority attributed to the data as the data is sent from the end module to the communication system.

According to yet another embodiment, a method is provided for routing data across the network. Data is routed from a first end point module to a second end point module, both of which are connected to the network. When a host is connected to the first end point module, a first packet of data is wrapped with the destination address corresponding to the first identification number of the first end point module. This allows for communicating the first packet of data to the host. The host can then be disconnected from the first end point module and connected to a second end point module. A second packet of data is then wrapped with a destination address corresponding to a second identification number of the second end point module. This allows for communicating the second packet of data to the host.

BRIEF DESCRIPTION OF THE DRAWINGS

Other objects and advantages of the invention will become apparent upon reading the following detailed description and upon reference to the accompanying drawings in which.

Figure 1:
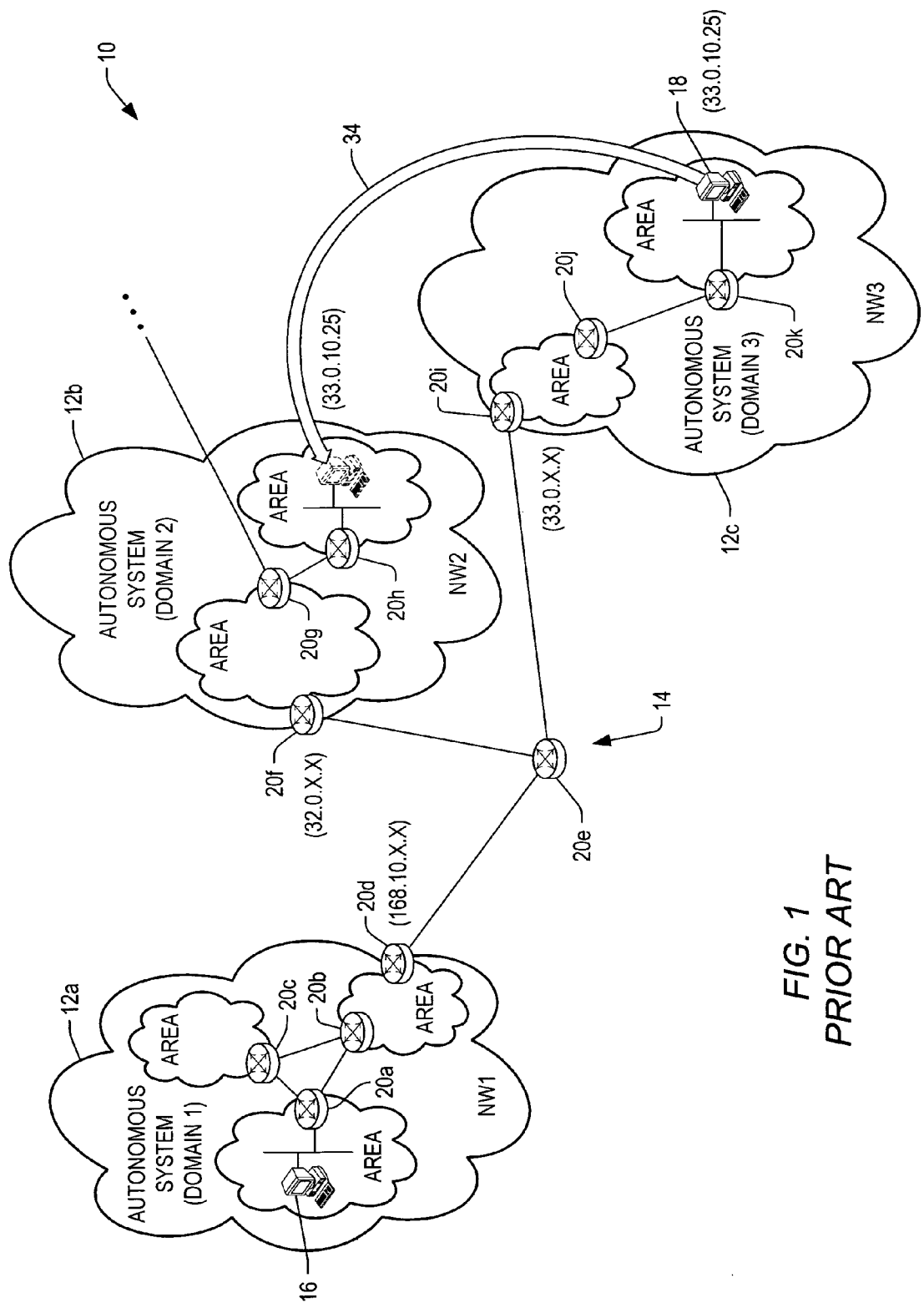
FIG. 1 is a plan diagram of an internet comprising an interconnected set of intranets that operate as autonomous routing systems, each having one or more communication devices or hosts.
Figure 2:
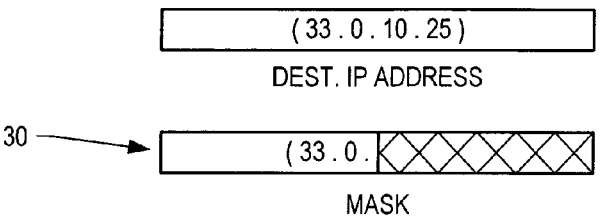
FIG. 2 is a plan diagram of network and host identification field segmentation of the internet protocol (IP) addressing scheme, and masking the host and network identifiers to expedite routing table look-up.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 3:
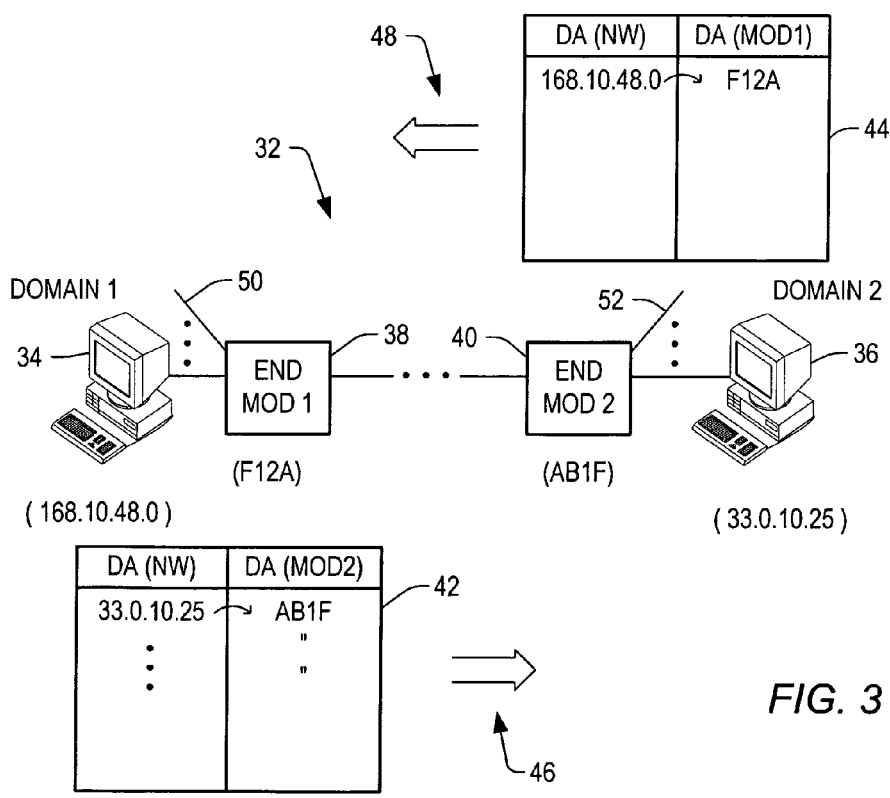
FIG. 3 is a block diagram of hosts connected to corresponding end modules, where the end modules are placed on opposing ends of a network (or a set of interconnected networks), and a mapping is shown to occur between the IP destination addresses of the moveable hosts and either structured or non-structured addresses of the corresponding end modules.

Turning now to the drawings, FIG. 3 illustrates an internet 32, to which a pair of hosts 34 and 36 are connected. At the distal ends of internet 32, adjacent hosts 34 and 36, are end modules 38 and 40, respectively. Using the example of FIG. 1, host 34 may operate to source a packet of data from network source address 168.10.48.0, for example. The packet of data is destined for host 36; however, host 36 has been moved from an intranet having an identification number 33.0 to another intranet having an identification number 32.0. The network identification number of host 36, nevertheless, remains the same: 33.0 (network identification number) and 10.25 (host identification number).

When host 36 is connected to its new location on end module 40, the network identification number 33.0.10.25 is mapped within a mapping table of module 40 to the identification number of module 40, which in the example shown is AB1F. As described herein above and below, the identification numbers are used for example purposes only, to explain the mapping mechanism by which the mobile networking environment operates. It is understood, however, that any addressing or identification numbers can be employed and need not follow any particular format, as set out in the examples. For example, the module identification number can be an Ethernet address and can represent a 48-bit addressing field. The network address can be an IPv4 address and contain a 32-bit field. Other addressing mechanisms beyond Ethernet can also be employed, including SONET. The network address field can also extend beyond 32 bits, and certainly can encompass the IPv6 specification of a 128-bit field. For sake of simplicity, the end modules comprise an identification that is 16 bits in length and the network identification field is shown 32 bits in length.

When host 36 is connected to the internet at the second point (i.e., is connected to end module 40), a mapping table 42 is formed in end module 40. Mapping table 42 shows the relationship between the destination address of the network (e.g., 33.0.10.25) and the destination address of end module 40 (e.g., AB1F). Mapping table 42 is conveyed to host 34 as part of the Address Resolution Protocol (ARP). Address resolution is a process of mapping the destination address of the network to the destination address of the end module. The destination address of the end module 40 can be, for example, the Ethernet address of the new addressing domain at which host 36 is connected. Alternatively, the destination address of end module 40 can be the Media Access Controller (MAC) address of the MAC sub-layer within the data-link addresses of the new addressing domain.

When the destination address of the network is successfully associated with the destination address of the end module, the end module 38 preferably stores the information in its ARP cache. The ARP cache enables devices to send data to a destination without creating ARP traffic since the end module 40 of the destination is already known. Accordingly, the ARP cache within the entry end module 38 stores the destination address of whatever data is sourced by host 34. Likewise, the mapping of a destination address for host 34 to a destination address of end module 38 is contained in end module 38 and passed to end module 40 so that any data sourced by host 36 will be targeted to the exit end module 38.

Mapping table 44 illustrates the relationship between end module 38 identification number and host 34 network identification number if host 34 is to be the destination address. Arrow 46 illustrates data being sent to host 36, and the mapping between exit end module 40 and destination host 36. Arrow 48 illustrates the transfer of data to destination host 34, and mapping between exit end module 38 and destination host 34. Again, the identification/addressing numbers shown in mapping tables 42 and 44 are for illustrative purposes only, and are not to be construed as a limitation as to possibly numerous identification formats contemplated herein.

Each end module 38 and 40 can receive possibly more than one host, as shown by lines 50 and 52, respectively. In addition to mapping tables 42 and 44, another mapping table may also be attributed to each end module. Like the first mapping table, the second mapping table also has a network destination address within its mapping field. The first mapping table maps the destination address of the network to a destination address of the exit end module, and the second mapping table maps the destination address of the network to the particular host (from among possibly many connected to the exit end module) that is destined to receive the data. While the first mapping table targets the exit end module, the second mapping table targets the particular host that is to receive the data, preferably the host that has been disconnected from the first point on the internet and reconnected to a second point on the internet. Mapping tables 42 and 44 illustrate the first mapping tables, the second mapping tables are shown below in reference to FIG. 5.

Figure 4:
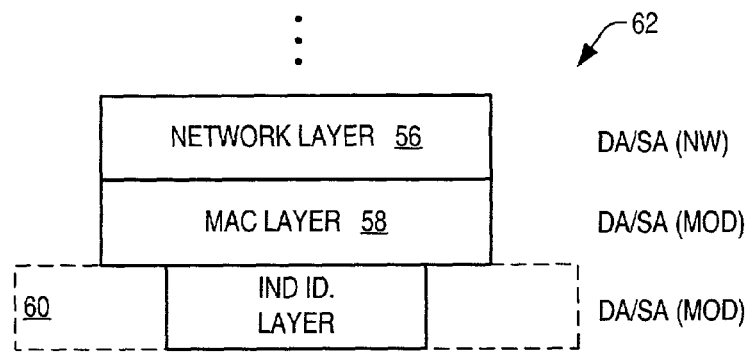
FIG. 4 is a model layer diagram showing the lower OSI layer (data/physical layer) with an independent addressing domain layer beneath the lower layer for carrying out structured addressing internal to networks, according to one embodiment.

Turning now to FIG. 4, the mapping within the first mapping table between a destination network address and a destination end module preferably takes place between the network layer 56 and the media access ("MAC") layer 58. Specifically, the incoming packet is wrapped with the network layer identification number as the packet enters the entry end module. Thereafter, the entry end module maps the network destination identification number to the destination address of the exit end module by wrapping the packet further with the MAC layer identifiers. If necessary, the entry end module can further wrap the data with even a lower layer 60 within the overall OSI model layers 62. The lower layer 60 has ascribed a grouping of identification numbers attributed to intermediate modules placed between the end modules 38 and 40, shown in FIG. 3. Thus, layer 60 illustrates a separate addressing domain that is lower than the MAC layer, and much lower than the network layer 58 and 56, respectively.

Packets of data can be sent over any type of media, including wired media or wireless media. The packets are wrapped, beginning at the network layer and ending at the MAC layer, or lower, at the independent identification layer. The independent identification layer attributes identification numbers to each intermediate module. These identification can be structured. The structure can be deterministic and hierarchical in nature. That is, each intermediate module can be given an identification number within layer 60 that is dependent on its location within an intranet. Moreover, intermediate modules within one intranet can be assigned a number based on the relative location of that intermediate module to intermediate modules in other intranets. For example, the first intermediate module within intranets 1, 2, and 3 can all have an identification number in the x1xx field with the third from the least most significant bit being assigned to the first intermediate module of all three intranets. The next intermediate module can be at the second from the least most significant bit, and so forth depending on how many intermediate modules are in each intranet.

Moreover, the structured or hierarchical addressing scheme employs a distributed routing mechanism using structured hierarchical decode mechanisms. Using the three level example, a structured or hierarchical decode mechanism attributes a bit or a sub-field of bits within a field of bits to one level distinct and separate from another bit, or another sub-field of bits attributed to another level. Knowing that the highest level of routing is currently at a certain module level, a resulting match is identified at a particular module, and comparison or decode process continues onto the next lower level to determine if further routing is needed. If the address at the next lower level of fields compare with an identification number in the next lower level field, then it is determined that the routing must continue to a particular module that yields the comparison.

Knowledge of the source and destination hosts whereabouts relative to the entry and exit end modules is a prerequisite to the present fast decoding algorithm. The mechanism for determining hosts relative to end modules is determined by the mapping tables stored in the end modules. It is, therefore, important to note that routing within the network between hosts can either be structured or non-structured (i.e., deterministic or non-deterministic). A layer 60 is present beneath the addressing domain wrapped onto the packet at layers 58 and 56. An additional wrap at the entry end module involves little, if any, overhead and, certainly, speeds the routing process through the structured organization of intermediate modules.

Figure 5:
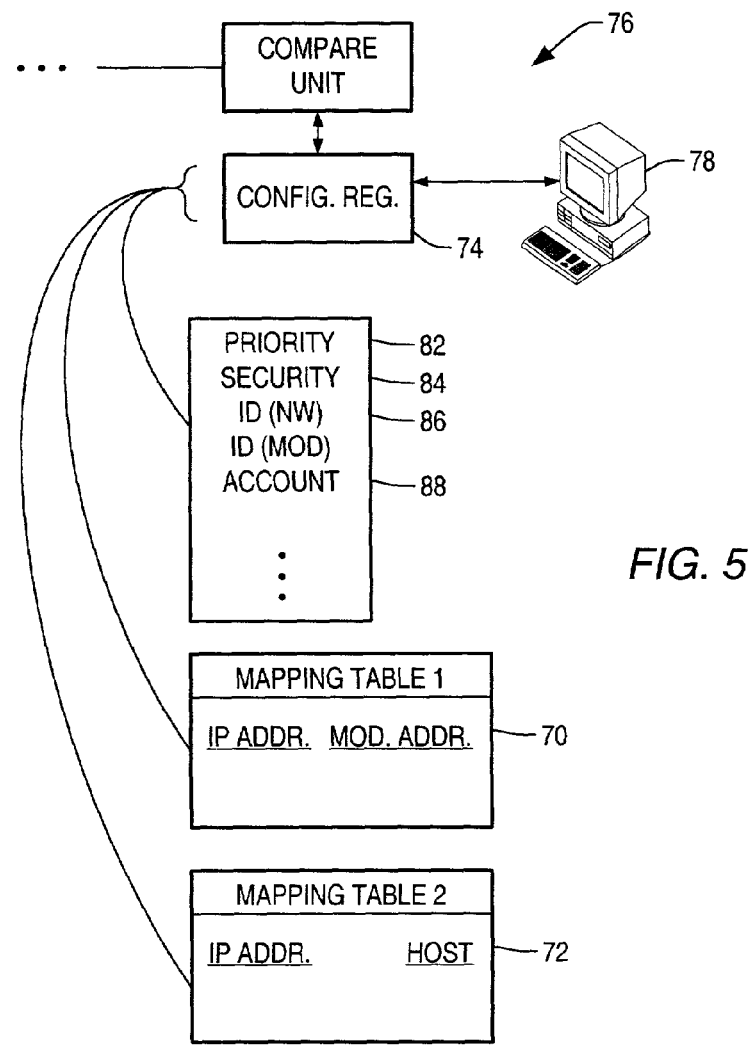
FIG. 5 is a block diagram of a host bearing software-encoded properties that are registered to an end module upon which the host is connected after being moved from another location of the internet.

FIG. 5 illustrates the first and second mapping tables 70 and 72 contained within configuration register 74 of end module 76. When host 78 is connected to the new point of the internet (i.e., connected to end module 76), host 80 downloads software bits stored in host 80 indicative of its properties and its network identification number, according to one example. The properties, such as transmission priority 82, security 84, and the network identification number 86 can also be downloaded to configuration register 74, along with possibly other information stored in host 78. For example, account information 88 can be downloaded into the configuration register, noting the amount of connect time by host 78. Depending on when connect occurred, and the amount of time a user accesses the internet from the new point, billing information can be sent to and from host 78. That is, connection of host 78 implements a registration or log-in and log-out procedures that downloads the appropriate information and accesses account information for billing purposes. A user, for example, located in Austin, Tex. can disconnect his/her computer, connect that computer to an altogether different entity's host in, for example, Tokyo, Japan, and access the internet. The access time can be tracked and billed to the home computer location of the user based on the network identification number of that computer logged into the new access point. In this fashion, the computer of a user is truly mobile, with the security bits and priority bits of the user's computer being attributed to his/her new location altogether different from the intranet at which home computer would normally reside. The home computer location is, therefore, known as the first point; the second point is the location at which the home computer is moved and connected when the user moves to a new location and wishes internet access at that new location.

When host 78 is connected to the new location (second point), the network identification number of host 78 is downloaded to the configuration register to form a first mapping table between the network identification number (or IP address) and the end module identification number (or module address), as shown by mapping table 70. The mapping table is conveyed to the entry end module of the network so that the network's destination address will be mapped to the end module adjacent the destination host when the packet enters the network.

In addition to the first mapping table, a second mapping table may be needed if multiple hosts are connected to an end module. Along with the exit end module address, the packet also contains the destination address of the network (IP address). While the module address indicates which end module to send the packet of data (i.e., route the information), the IP address on the packet, while not used for routing, is used to map to possibly more than one host connected to the exit end module. If only one host is connected to the exit end module, then the IP address need not be sent with the packet. Instead, only the destination exit end module identification number need be sent.

Figure 6:
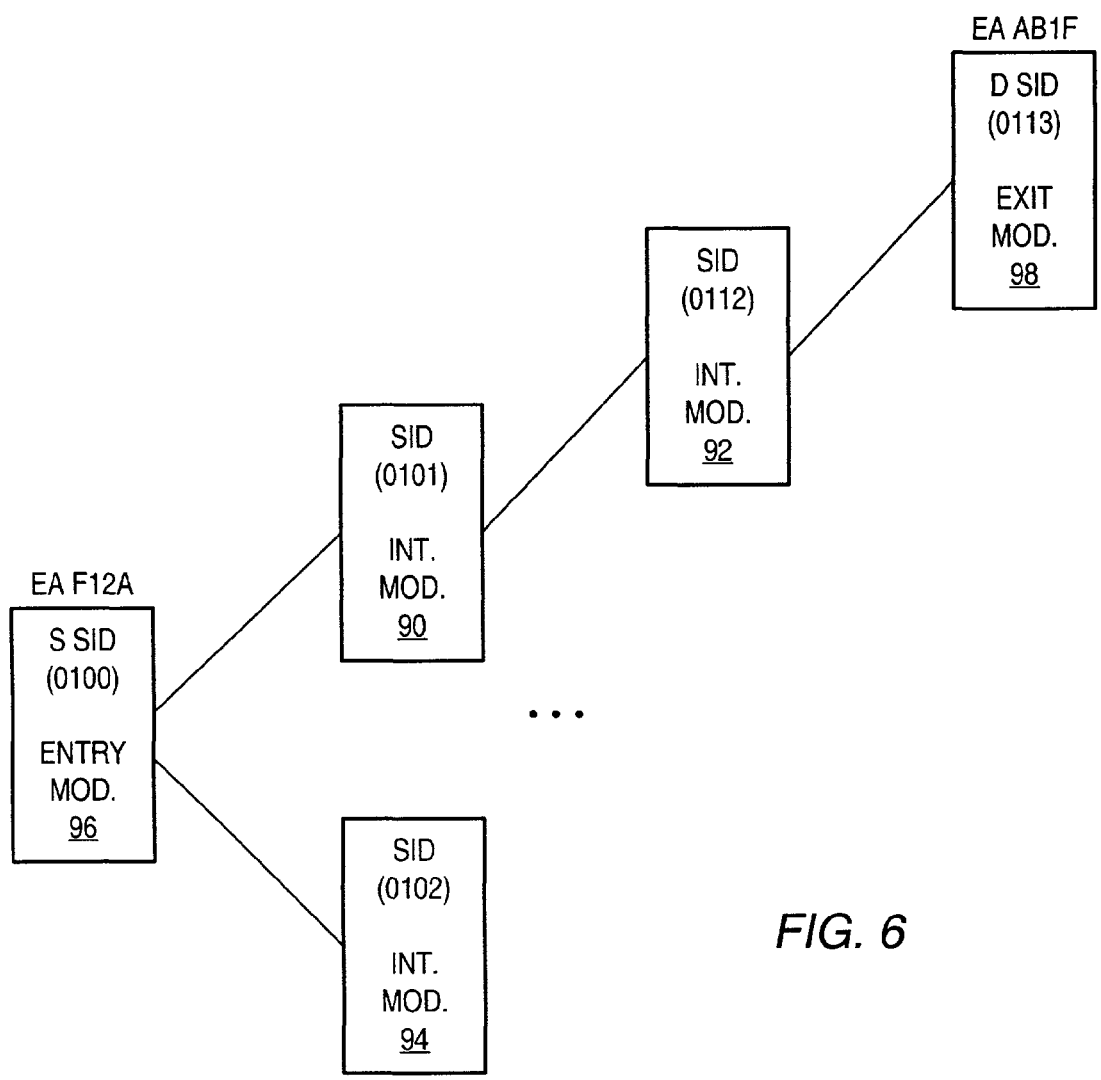
FIG. 6 is a block diagram example of which Ethernet addresses and IP addresses can be assigned to modules outside a first addressing domain, with structured addresses assigned to modules within the network (i.e., end module and intermediate modules), wherein a mapping occurs at the end modules between the first addressing domain and a second addressing domain.

FIG. 6 illustrates a lower layer independent identification numbers attributed to intermediate modules 90, 92, and 94 within a structured, hierarchical network. The structured identification numbers (SIDs) are arranged hierarchically based on the relative location of intermediate modules 70, 72, and 74 within the overall network. The example of FIG. 6 illustrates only two intermediate modules; however, it is recognized that more than two intermediate modules can be employed within the network. In addition, the structured identification numbers are shown as 16-bit identifiers. However, more than 16 bits may be needed depending on the size of the network.

Data enters the network by the entry end module 96 and arrives on the exit end module 98. The entry end module may have an Ethernet address attributable to a higher level, similar to the exit end module. Addressing between end modules can occur using the Ethernet identifiers as the target addresses, however, addressing among the intermediate modules occurs solely through the structured identification numbers. Thus, packets which enter the entry end module 96 contain not only the destination address of the Ethernet address AB1F, but also the next intermediate module SID number 0101. The end modules are connected to respective hosts having a higher level network identification number which does not change regardless of a host moving from one end module to another. The identification numbers of the end modules also do not change and are based on their location within the overall internet. Routing takes place via the entry and end modules, and the network identification number of the hosts are used only to initiate mapping and to attribute properties.

It will be appreciated to those skilled in the art having the benefit of this disclosure that the various embodiments described herein are believed to be capable of performing fast and efficient transfers across hosts that are connected and reconnected to various points of an internet. The network may or may not be structured. Regardless of its addressing mechanism or domain, the network advantageously maps end module identification numbers to host identification numbers (network identification numbers) of a mobile host. It is intended that the following claims be interpreted to embrace all such modification and changes; accordingly, the specification and drawings are to be regarded in an illustrative, rather than a restrictive, sense.

What is claimed is:
1. A communication network having multiple domains, comprising:

a network of interconnected nodes that communicate using the Open System Interconnect ("OSI") model, which includes a media access controller ("MAC") layer;

an independent identification layer independent of the MAC layer, wherein said independent identification layer is beneath or above the layer set forth by the OSI model;

a first end module and a second end module connected to each other at different domains by the network, wherein the first and second end modules each have a unique identification number in said independent identification layer independent of the MAC layer and independent of the IP address;

at least one host, connectable to either end module;

wherein the network comprises a plurality of interconnected intermediate modules, each bearing an intermediate module identification number in said independent layer that is dependent on its location within the network, and each of which perform only a portion of a distributed routing operation that extends across the network; and a mapping table within the second end module that corresponds to the unique identification number in said independent layer of the second end module with an address of a host in said independent layer removed from the first end module and coupled to the second end module, wherein said host address does not change when said host is removed from the first end module and coupled to the second end module, and said host address is at a layer above or below the layer set forth in the Open System Interconnection (OSI) reference model for said unique identification number of the second end module;

wherein a packet of data is deterministically routed to said host through a module based at least in part on said unique identification number.

2. The communication network as recited in claim 1, further comprising means for sending data to the host by addressing the identification number of the second end module rather than the first end module after the host is removed from the first end module and coupled to the second end module.

3. The communication network as recited in claim 1, further comprising means for sending data to the host by addressing the identification number of the first end module rather than the second end module during times prior to the host being removed from the first end module and coupled to the second end module.

4. The communication network as recited in claim 1, wherein the network comprises an internet.

5. The communication network as recited in claim 1, wherein the first end module comprises a physical link interface and a media access controller, and wherein the identification number of the first end module comprises an address of the media access controller.

6. The communication network as recited in claim 1, wherein the second end module comprises a physical link interface and a media access controller, and wherein the identification number of the first end module comprises an address of the media access controller.

7. The communication network as recited in claim 1, wherein the network comprises a plurality of interconnect intermediate modules, each bearing an intermediate module identification number bifurcated into several grouping of bits, wherein a first grouping of said several groupings of bits identifies a first module for receiving data of the network and a second grouping of said several groupings of bits identifying a second module for receiving the data from the first module.

8. An end module adapted for connection to a multiple domain communication system at any domain, wherein said multiple domain communication system uses layers of the Open System Interconnect ("OSI") model comprising:

the end module having a unique identification in a layer independent of the OSI layers at an address attributable to a higher layer in the OSI model;

a configuration register configured to store a mapping table of an identification number in said independent layer for the end module corresponding to an address of a host removed from another location distal from the end module and thereafter coupled to the end module wherein the physical location of said host is not determinative;

the configuration register being further adapted to store a property of the host, conveyed from the host when the host is coupled to the end module and a registration procedure is undertaken, the property including at least an address of the host in said independent layer that remains with the host and does not change regardless of where the host is connected to the communication system, said address including a unique independent identification in a layer lower than a media access controller layer of said OSI model;

wherein said communication system is structured to include at least one intermediate module, wherein the independent identification number in said independent layer of said one intermediate module is dependent upon its location within said system; and a compare unit coupled to the configuration register for receiving a packet of data wrapped with the identification number of the end module in lieu of the address of the host for deterministic routing the data to the host through said at least one intermediate module based at least in part on said unique identification number if the identification number in said independent layer in the mapping table corresponds to the address of the host.

9. The end module as recited in claim 8, wherein the security code comprises at least one bit that is placed on a packet of data symbolizing an amount of security attributed to the data as the data is sent from the end module to the communication system.

10. The end module as recited in claim 8, wherein the property comprises a priority code that remains with the host and does not change regardless of where the host is connected to the communication system.

11. The end module as recited in claim 10, wherein the priority code comprises at least one bit that is placed on a packet of data symbolizing an amount of transmission priority attributed to the data as the data is sent from the end module to the communication system.

12. A method for routing data across a multiple domain network having a first endpoint module and a second endpoint module connected to the network at different domains, comprising:

connecting a host having a static address to the first endpoint module;

wrapping a first packet of data with a destination address corresponding to a first identification number of the first endpoint module for communicating the first packet of data to the host;

disconnecting the host from the first endpoint module and connecting the host to the second endpoint module, wherein said host static address does not change;

wrapping a second packet of data with a destination address corresponding to a second identification number of the second endpoint module for communicating the second packet of data to the host;

wherein said first and second identification numbers include unique identification independent of an IP address and a media access layer identification of the Open System Interconnect ("OSI") model and said host static address maps to a respective unique identification number at a layer above or below the layer set forth in the Open Systems Interconnection (OSI) reference model of the International Standards Organization (ISO) which contains said unique identification number;

wherein said network includes a plurality of intermediate modules between said first and second endpoint modules, wherein said intermediate modules have unique identification numbers dependent upon their locations within said network; and deterministic routing said second packet of data to said host through one or more intermediate modules based on said unique identification number.

13. The method as recited in claim 12, wherein said connecting the host to the first endpoint module comprises first mapping an address of the host to the first identification number, and wherein said connecting the host to the second endpoint module comprises second mapping the address of the host to the second identification number.

14. The method as recited in claim 13, wherein said communicating the first packet of data to the host comprises routing the first packet of data to the first endpoint module and passing the first packet of data to the host based on said first mapping.

15. The method as recited in claim 13, wherein said communicating the second packet of data to the host comprises routing the second packet of data to the second endpoint module and passing the second packet of data to the host based on said second mapping.

16. The method as recited in claim 12, wherein said host address does not participate in routing the first and second packets of data.

17. The method as recited in claim 12, wherein routing tables in said network do not change as a result of said disconnecting step.

18. The method as recited in claim 12, wherein said network includes a plurality of intermediate modules between said first and second endpoint modules, wherein said intermediate modules have unique identification numbers dependent upon their locations within said network; and deterministic routing said second packet of data to said host through one or more intermediate modules based on said unique identification number.

* * * * *